June 28, 1966 J. VANDER HORST 3,257,912

FORCE AMPLIFIER

Filed Dec. 30, 1963 4 Sheets-Sheet 1

INVENTOR.
JOHN VANDER HORST
BY
Van Valkenburgh & Lidd
ATTORNEYS

June 28, 1966 J. VANDER HORST 3,257,912

FORCE AMPLIFIER

Filed Dec. 30, 1963 4 Sheets-Sheet 2

INVENTOR.
JOHN VANDER HORST
BY
Van Valkenburgh & Fields
ATTORNEYS

June 28, 1966 J. VANDER HORST 3,257,912

FORCE AMPLIFIER

Filed Dec. 30, 1963 4 Sheets-Sheet 3

INVENTOR.
JOHN VANDER HORST
BY
Van Valkenburgh & Fiedler
ATTORNEYS

FORCE AMPLIFIER

Filed Dec. 30, 1963 4 Sheets-Sheet 4

INVENTOR
JOHN VANDER HORST
BY
Van Valkenburgh and Fields
ATTORNEYS

United States Patent Office 3,257,912
Patented June 28, 1966

3,257,912
FORCE AMPLIFIER

John Vander Horst, Denver, Colo., assignor to Floyd K. Haskell, Allen D. Gray, and James A. Krentler, trustees, Denver, Colo.

Filed Dec. 30, 1963, Ser. No. 334,439
12 Claims. (Cl. 91—49)

This invention relates to fluid operated force amplifiers. This application is a continuation-in-part of my copending application Serial No. 271,027, filed April 5, 1963, now abandoned.

For the control of various types of equipment or parts thereof, such as for operating valves, chucks, positioning devices, actuating devices, compressing devices, opening devices, closing devices, and other elements or parts, particularly when the control force is of small magnitude and the force necessary to operate the part or device being controlled is of considerably greater magnitude, it is desirable to provide a force amplifier. Such a force amplifier should be linearly responsive to the control force, should require a minimum of power for actuation, and should retain the position of the controlled part or device, within the limits of accuracy required for the operation being carried out. Since a supply of fluid, either air or other gaseous fluid, as well as hydraulic fluid, is normally readily available, such a force amplifier is conveniently fluid operated.

Among the objects of this invention are to provide a novel, fluid actuated force amplifier; to provide such a force amplifier which requires a minimum of force for actuation; to provide such a force amplifier which will be positive in its response to the actuating force; to provide such a force amplifier which may exist in several different forms; to provide such a force amplifier which, in one or more forms thereof, may be controlled within relatively narrow limits; to provide such a force amplifier which, in other forms thereof, may be controlled with less accuracy but still within the necessary limits; to provide such a force amplifier which, in another form, may be controlled manually; to provide such a force amplifier which, in still another form, may be controlled by a solenoid or similar device; to provide such a force amplifier which, in each such form, is relatively simple in construction; and to provide such a force amplifier which, in each such form, is efficient and effective in operation.

Additional objects and the novel features of this invention will become apparent from the description which follows, taken in conjunction with the accompanying drawings, in which.

Figure 1:
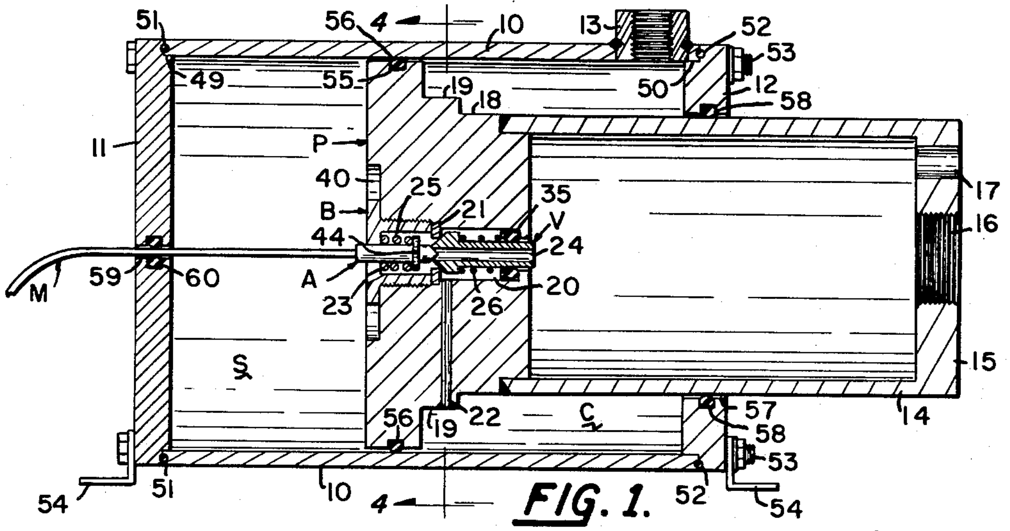
FIG. 1 is a longitudinal section of a fluid operated force amplifier constructed in accordance with this invention.
Figure 4:
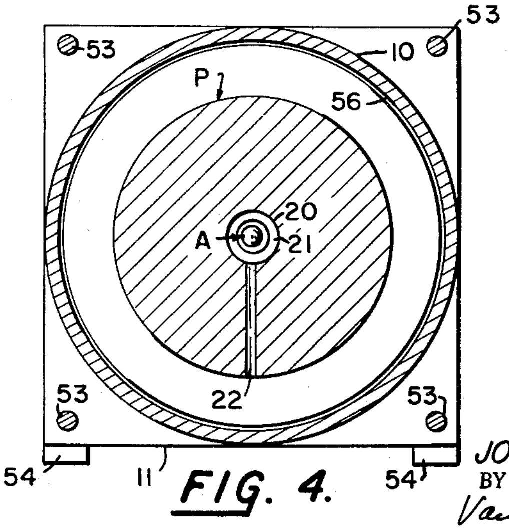
FIG. 4 is a transverse section, taken along line 4—4 of FIG. 1.

As illustrated in FIGS. 1 and 4, a force amplifier constructed in accordance with this invention may include a tubular cylinder 10, the opposite ends of which are closed by end walls 11 and 12 and to which a fluid, such as compressed air or a hydraulic fluid, may be supplied through an inlet connection 13. A piston P is mounted within cylinder 10 and is provided with a conveniently cylindrical, hollow piston rod 14 having, in the closed, outer end 15 thereof, a central, tapped hole 16 for connection to the part or device to be controlled, such as a rod, tube or the like which is connected to the part or device to be controlled. End 15 of piston rod 14 is also conveniently provided with a hole 17 for discharge of air, when supplied to inlet connection 13, but hole 17 may be tapped to permit the connection of a discharge hose, when hydraulic fluid or a gas other than air is supplied to inlet connection 13. In general, when the fluid supplied to inlet connection 13 does not require recapture, outlet hole 17 may permit the fluid to escape, but when the fluid is to be recaptured, then a discharge hose or the like should be connected to hole 17.

The area on opposite sides of piston P differs, since on one side, the full area of the piston is exposed to the fluid in cylinder 10, while on the opposite side, the pressure area is restricted to that around the piston rod 14 and a reduced section 18 of the piston having a shoulder 19, the former of which preferably corresponds to the outer diameter of piston rod 14. Thus a primary pressure chamber C is provided on the reduced area side of piston P, while a secondary pressure chamber S is provided on the opposite side of the piston. The full pressure of fluid is exerted in primary pressure chamber C, while a lower pressure is normally exerted in a secondary chamber S. Assuming that the piston area exposed to the pressure in primary chamber C is one half of the piston area exposed to the pressure in secondary chamber S, when the pressure in chamber S is one half of the pressure in chamber C, the piston will be in a balanced condition. However, if the pressure in chamber S is increased, the piston P and piston rod 14 will be moved to the right, as viewed in FIG. 1, while if the pressure in chamber S is reduced, the piston P and its piston rod 14 will be moved to the left.

In accordance with this invention, the pressure in chamber S is controlled, through a control member M, by a valve V, mounted for axial movement in a valve chamber 20 in piston P, and an auxiliary valve A, which is connected to control member M and is mounted for axial movement in a bushing B. In general, when valve V is opened or moved away from its seat at a ring 21, fluid in chamber C will flow through a passage 22 in piston P leading to valve chamber 20, past auxiliary valve A and into chamber S through a hole 23 in bushing B, thereby increasing the pressure in secondary chamber S. Such movement of valve V will be in response to pushing or movement of control member M toward the right, as viewed in FIG. 1. When control member M is pulled or moves to the left, valve V will seat, if not already seated, and valve A, which normally seats against the mouth of a longitudinal passage 24 in valve V, will be unseated, permitting fluid in chamber S to escape through passage 24 in valve V, into the hollow piston rod 14. As will be evident, upon a change in the position of control member M, the pressure in secondary chamber S will be increased or reduced, as the case may be, to move piston P and its piston rod 14, to the right or to the left, as viewed in FIG. 1. Thus, the piston P will be linearly responsive to movement of control member M. To increase the effectiveness of the response, valve A is urged toward valve V by a heavier spring 25, while valve V is urged in the opposite direction by a lighter spring 26, when the control member comprises a flexible cable 27, as in FIGS. 2 and 3, having a coating 28, as of plastic, to provide a smooth outer surface for sealing purposes, as described later.

Figure 2:
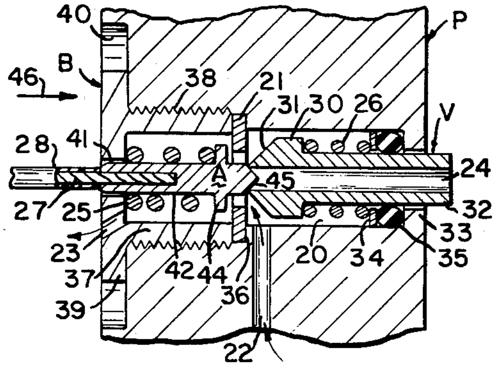
FIG. 2 is a fragmentary section, on an enlarged scale, showing the central portion of the force amplifier of FIG. 1 and particularly the position of the parts when the actuating or control force produces movement in one direction.
Figure 3:
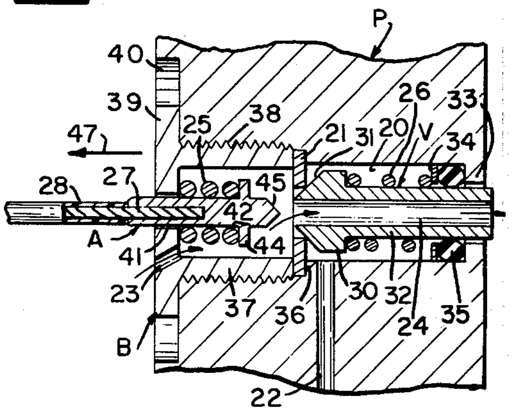
FIG. 3 is an enlarged, fragmentary section similar to FIG. 2, but showing the position of the parts when the control or actuating force produces movement in the opposite direction.

Valve V, as in FIGS. 2 and 3, is provided with a head 30, having a conical seating surface 31 which engages ring 21, and a stem 32 which extends through a hole surrounded by an inwardly extending, annular flange 33 of piston P. One end of spring 26 bears against the head 30 of valve V and the opposite end against a washer 34, which forces an O-ring 35 against the outside of stem 32 of valve V for sealing purposes, i.e., to seal the valve chamber 20 from the discharge passage through piston rod 14. Valve seat ring 21 is conveniently held in position against a shoulder 36 in valve chamber 20 by the end of a hollow, circular stem 37 of bushing B, which is provided with threads 38 for engaging corresponding threads tapped in piston P. Bushing B is provided with a head 39 having a non-circular configuration, such as hexagonal, for engagement by a suitable tool for tightening or removing the bushing, while the piston is provided with a well 40 to accommodate the head of the bushing. The bushing head 39 is also provided with a central hole 41, through which a stem 42 of auxiliary valve A moves, as well as hole 23, which is conveniently diagonally disposed. The auxiliary valve A is provided with a lateral flange 44, against which one end of heavier spring 25 bears, with the opposite end of spring 25 bearing against the inside of head 39 of bushing B. Flexible cable 27 may be attached to valve A, as in a hole in stem 42 thereof, in any suitable manner, as by brazing. Valve A is also conveniently provided with a conical point 45, which seats in the mouth of passage 24 of valve V. As will be evident, either the surface 31 of valve V or the conical point 45 of auxiliary valve A, or both, may be provided with a ring of sealing material, while the inner edge of ring 21 or the mouth of passage 24, or both, may be beveled or provided with a special sealing material.

As will be evident from FIG. 2, when the force on flexible cable 27 is released, i.e., the control force tends to push the flexible cable inwardly into the cylinder, heavier spring 25 will overcome the pressure of lighter spring 26 and force the sealing surface 31 of valve V away from its seat against ring 21, thereby permitting the fluid in primary chamber C to flow through the hole in piston P into valve chamber 20, thence around auxiliary valve A and through hole 23 into the secondary pressure chamber S, as indicated by the arrows. Also, when auxiliary valve A is closed but valve V is open, O-ring 35 will seal the stem of valve V, so that the fluid passing from the primary pressure chamber C into the secondary chamber S cannot be discharged through the piston rod. As soon as the pressure in chamber S builds up sufficiently to exert a greater force against piston P than the pressure in chamber C, the piston will be moved to the right, as indicated by the heavier arrow 46 of FIG. 2. Normally, of course, the piston P will be in a balanced condition and will be moved in small increments, except when a considerably greater extent of movement is required by the control member.

As will be evident from FIG. 3, when the control member is moved in the opposite direction, as when cable 27 is pulled out of the cylinder, the auxiliary valve A will be moved away from the valve V, causing point 45 to be unseated from the mouth of passage 24 and permitting the fluid in the secondary chamber S to flow from the secondary chamber, through hole 23, around valve A and thence through passage 24 in valve V, for discharge through the hollow piston rod 14, as indicated by the arrows. This will cause the piston P to be moved to the left, as indicated by heavier arrow 47 of FIG. 3. Of course, even though valve V was previously withdrawn from its seat, as auxiliary valve A withdraws from valve V, spring 26 will force the conical surface 31 of valve V into engagement with the seat at ring 21.

For convenience in assembly and simplicity in construction, the opposite ends of cylinder 10 may surround an annular shoulder 49, formed in the inner face of end wall 11, and an annular shoulder 50, formed in the inner face of end wall 12, with the respective ends of the cylinder abutting against sealing rings 51 and 52, respectively, such as conventional O-rings. The inlet connection 13, which is conveniently interiorly threaded, as shown, for attachment to a fluid supply hose, is conveniently placed in a hole drilled in cylinder 10 and then welded thereto, as shown. The end walls 11 and 12 are clamped against the ends of cylinder 10 by a series of bolts 53 which are merely tightened against the end walls. The lower pair of bolts 53 are adapted to be utilized for attachment of brackets 54, by which the force amplifier may be mounted in any desired position.

The piston P is conveniently provided with a peripheral groove 55 in which is disposed a sealing ring, such as a conventional O-ring 56, for sealing purposes, while the piston rod 14 and also the reduced section 18 of the piston, if the piston should move to the right in FIG. 1 to that extent, move through a circular aperture 57 in end wall 12, in which is provided a circumferential groove for receiving a sealing ring, such as a conventional O-ring 58. Shoulder 19 in piston P prevents the outer end of hole 22 from engaging O-ring 58 and thereby being sealed off. The inner end of piston rod 14 conveniently extends over an annular shoulder, formed at the end of reduced section 18, with the piston rod being attached thereto, as by welding as shown, or in any other suitable manner. It will be understood that the cylinder and the piston need not be cylindrical, but may be non-circular in shape, while the piston rod 14 and the corresponding aperture 57 need not be circular but may be non-circular in shape, in the event that the part or device to be controlled should not rotate or twist during longitudinal movement.

As indicated previously, flexible cable 27 has a plastic sheath or covering 28, so that the cable will be adequately sealed when moving inwardly and outwardly through a hole 59 in end wall 11, surrounded by a groove in which is disposed a suitable seal, such as an O-ring 60. As will be evident, the force required to be produced by the control member M, in order to cause the piston rod 14 to move in either direction, is very small, as compared with the force which can be exerted in either direction by the piston rod 14. Thus, aside from the friction encountered by engagement with O-ring 60, the heavier spring 25 requires a minimum of force to be exerted in order to open valve V, so as to move the piston P to the right, as in FIG. 2, while the control force need only overcome the pressure of spring 25 in causing the piston P to move to the left, as in FIG. 3. Although spring 25 has been described as heavier than spring 26, to permit use of a flexible cable as the control member, this does not necessarily mean that its is larger, although shown so, but only that spring 25 exerts a greater force than spring 26, since springs 25 and 26 may be made of the same diameter wire but of different types of material.

The control member M, when a flexible cable, may be connected to a governor, for instance, or may be connected to a longitudinally movable control member, or may be connected to a pressure responsive diaphragm, or may be wound around a drum or cylinder when the control force is produced as angular motion. There are, of course, numerous other types of control situations in which a flexible cable can be conveniently employed.

Figure 5:
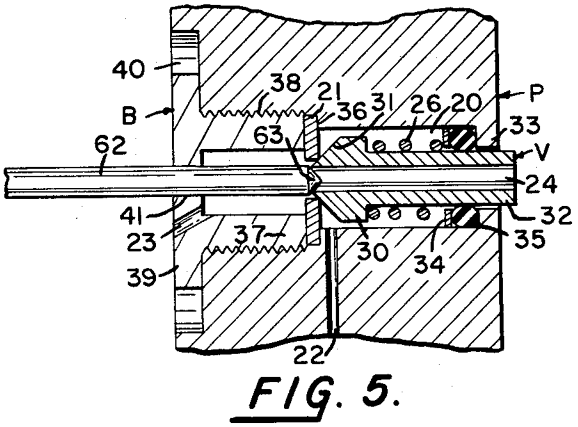
FIG. 5 is a fragmentary section similar to FIGS. 2 and 3, but illustrating a modified construction.

In the event that the control force is produced by longitudinal motion, the flexible cable of FIG. 1 may be replaced by a solid rod, such as rod 62 of FIG. 5, which extends through hole 41 in the head of bushing B and is provided with a conical point 63 adapted to seat against the mouth of longitudinal passage 24 in valve V. The remaining parts of the modified form of the force amplifier illustrated in FIG. 5 may, of course, be similar to the parts shown in FIGS. 1–3, as indicated by corresponding reference numerals. As will be evident, the control rod 62 of FIG. 5 will extend through hole 59 of FIG. 1, in end wall 11, and will be sealed by O-ring 60, in a manner similar to that described previously. Also the operation of the modified form will be the same as that described above in connection with FIGS. 2 and 3. It will be evident, of course, that control rod 62 requires no spring pushing auxiliarly valve A against valve V, for obvious reasons.

Figure 6:
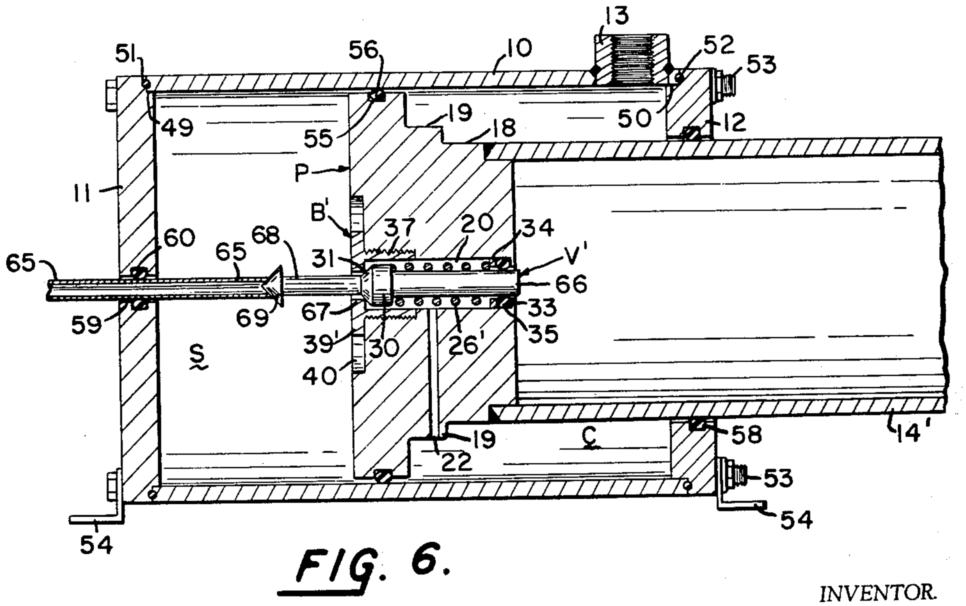
FIG. 6 is a longitudinal section of a force amplifier constructed in accordance with this invention and forming an alternative embodiment thereof.

In the alternative embodiment of this invention illustrated in FIG. 6, the discharge from the secondary chamber S is accomplished through the control member itself, such as a hollow tube 65, which again moves through hole 59 in end wall 11 and is sealed by O-ring 60. A valve V′ is provided with a longer but solid stem 66, which is sealed by O-ring 35, and with a head 30 having a conical sealing surface 31 adapted to seat against the inner edge of a hole 67 in the head 39′ of a bushing B′. Valve V′ is further provided with an extension stem 68 having a conical end 69 adapted to seat in the mouth of control tube 65. Valve V′, of course, requires a longer spring 26′, but otherwise operates in the same manner as described previously. Also, the other parts of the force amplifier are similar to those previously described in connection with FIG. 1, except that the discharge of fluid is no longer through the hollow piston rod 14′, the extending end of which may be attached in any suitable manner to the part to be controlled by the control tube 65.

As will be evident, when control tube 65 is moved to the right, as viewed in FIG. 6, the mouth of the tube will remain in engagement with the conical end 69 of extension stem 68 of valve V′, but conical surface 31 of valve V′ will be moved away from its seat at hole 67, permitting the fluid under pressure in primary chamber C to flow through hole 22 in the piston and into valve chamber 20, thence through hole 67 into secondary pressure chamber S. An accumulation of pressure in chamber S will then cause the piston P to be moved to the right. Also, when the control tube 65 is moved to the left, as viewed in FIG. 6, the valve V′ will remain closed but the mouth of tube 65 will be moved away from the conical end 69 of valve V′, permitting fluid in secondary chamber S to escape through control tube 65. If the fluid being utilized is air, the air may merely be permitted to escape to the atmosphere, but when the fluid is a hydraulic fluid or a more expensive gaseous fluid than air, a return hose may be connected to control tube 65, to recover the discharge fluid. The embodiment illustrated in FIG. 6 is particularly advantageous when the piston rod 14′ extends into another part, or is so closely coupled to the part which is controlled that discharge through piston rod 14 would be inconvenient.

Figure 7:
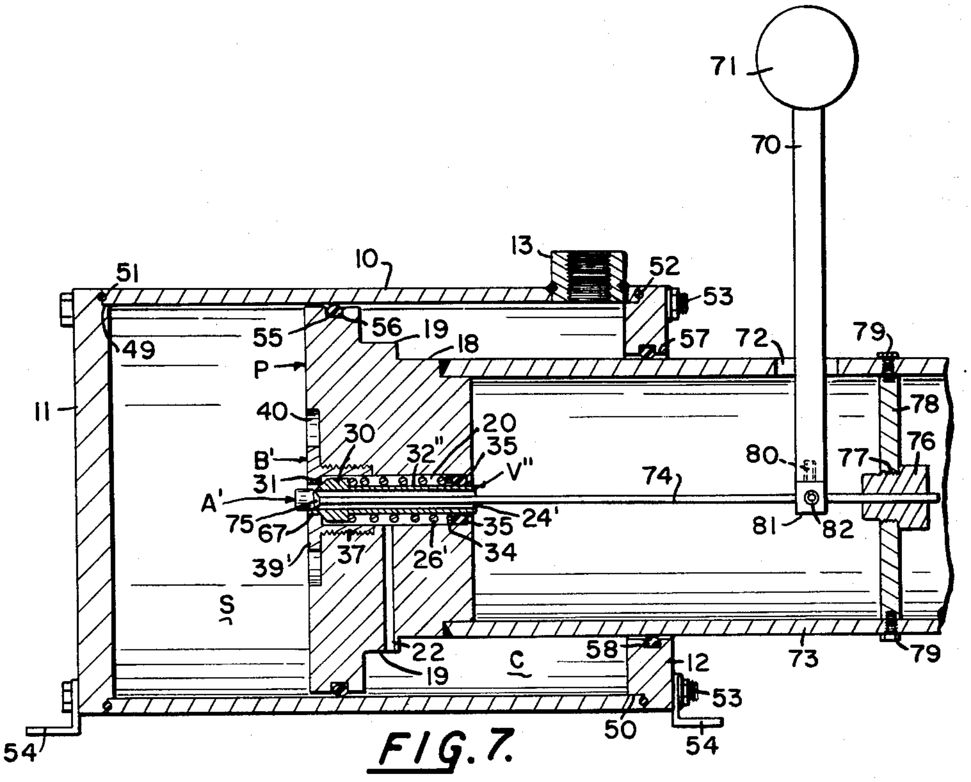
FIG. 7 is a longitudinal section of a force amplifier constructed in accordance with this invention and forming a further embodiment thereof, which is particularly adapted to be controlled manually.

The further embodiment of FIG. 7 is particularly adapted to be controlled manually, as through a handle 70 having a knob 71 on its outer end. Handle 70 extends through a slot slot 72 in piston rod 73 and is adapted to move a control rod 74, on the opposite end of which is mounted an auxiliary valve A′ having a conical surface 75, adapted to seat in the mouth of a passage 24′ of a valve V″, which is similar to valve V of FIG. 1 but has a longer stem 32″ and is urged toward central hole 67 in a bushing B′, which is similar to bushing B′ of FIG. 6.

Valve "V" is urged toward its seat by a spring 26′, similar to spring 26′ of FIG. 6, i.e., similar to spring 26 of FIG. 1 but longer. As before, valve V″ is sealed by an O-ring 35 in the rear edge of piston P and air or fluid escaping through passage 24′ of valve V″, upon opening of auxiliary valve A′, will flow from secondary chamber S to the interior of hollow piston rod 73 and out through slot 72. For this reason, air is preferably utilized as the fluid supply to inlet connection 13 and primary pressure chamber C.

Rod 74 may be guided at its outer end by a sleeve 76, conveniently engaging a threaded hole 77 in a circular mounting plate 78, preferably removably attached within hollow piston rod 73, as by cap screws 79. Handle 70 is connected to control rod 74 in any suitable manner, as by its inner end threadedly engaging a stud 80 extending from a mounting block 81, in turn attached to rod 74, as by a set screw 82.

Piston rod 73 is shown as extending longitudinally from control handle 70, for attachment to the part to be moved, such as one side of the chuck of a drill or jig, the movable head of a drill press, or a similar part. As will be evident, whenever handle 70 is moved to the right, as viewed in FIG. 7, valve V″ will be opened and air will flow from primary chamber C through hole 22 to valve chamber 20 and thence through hole 67 into secondary pressure chamber S, thus causing the piston P and piston rod 73 to be moved to the right. As soon as the piston rod 73 reaches the desired position, or the desired pressure is exerted thereby, the handle 70 may be released. Similarly, when handle 70 is moved to the left, again as viewed in FIG. 7, auxiliary valve A′ will be unseated and air will be discharged from secondary chamber S through passage 24′ of valve V″, into the interior of hollow piston rod 73 and out through slot 72, causing piston P and piston rod 73 to be moved to the left. Thus, control handle 70 will be moved in the same direction. Also, control handle 70 may be held in the direction of desired movement until piston rod 73 and particularly the part controlled thereby, reaches any desired position.

Figure 8:
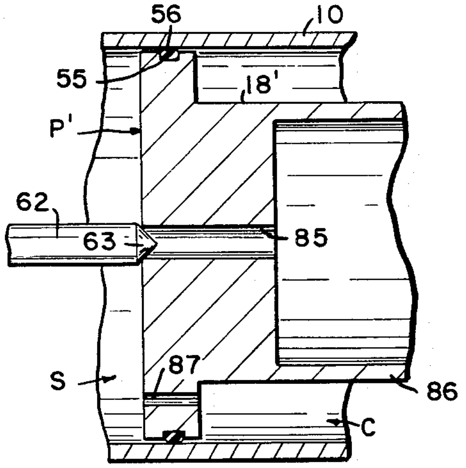
FIG. 8 is a fragmentary, longitudinal section of a force amplifier constructed in accordance with this invention and forming a still further embodiment thereof.

The alternative embodiment of FIG. 8 is a considerably simplified construction, particularly adaptable for use where extreme accuracy in position is not necessary and utiliizng only one valve, which is provided by the conical point 63 of a control rod 62, adapted to seat in the mouth of a central passage 85 in a piston P′. Rod 62 is similar to control rod 62 of FIG. 5, and controls the flow of fluid from secondary chamber S to the interior of a hollow piston rod 86, for discharge in the manner described previously. Flow from primary pressure chamber C into secondary chamber S takes place continuously, at a controlled but preferably low rate, through a bleed hole 87 in piston P′, thus causing piston P′ and piston rod 85 to tend to move to the right, as viewed in FIG. 8.

When control rod 62. is stationary, piston P′ will, as explained above, move to the right but point 63 of control rod 62 will be unseated and fluid will be discharged from secondary pressure chamber S through passage 85 and into the hollow piston rod 86, until the flow of fluid through passage 85 equals the flow of fluid, in the opposite direction, through bleed hole 87. The piston P′ will then become stationary. However, if control rod 62 is moved to the right, its point 63 will seat against the mouth of passage 85 and the fluid bleeding through hole 87 will again cause piston P′ to move to the right, as long as point 63 of control rod 62 remains seated. Thus, piston P′ will continue to move to the right, until control rod 62 becomes stationary, whereupon the balanced condition, i.e., the discharge through passage 85 will equal the fluid bleeding through hole 87, is obtained and the piston will again become stationary. When control rod 62 is moved to the left, its point 63 will move further away from the mouth of passage 85, so that the discharge of fluid from secondary pressure chamber S, through passage 85, will exceed the flow of fluid from chamber C to chamber S through bleed hole 87, causing the piston P′ to move to the left, i.e., in the same direction of movement as control rod 62, until point 63 of the control rod approaches its seat sufficiently that the discharge through passage 85 will equal the flow through bleed hole 87, whereupon piston P′ will again become stationary. Central passage 85 in piston P′ must, of course, be larger than bleed hole 87.

Piston P′ is adapted to move within a cylinder 10, as before, being sealed around its peripheral edge by an O-ring 56, while the end walls of the cylinder and inlet connection may be similar to the corresponding parts illustrated in FIG. 1. The axially extending, hollow piston rod 86 is shown as being integral with the piston, but may be a separate part and attached thereto, it being understood that the opposite end of the piston rod 86 is connected to the part to be controlled. Control rod 62 is connected to, or forms part of, the device which controls or actuates the force amplifier, and extends through an end wall of cylinder 10, as before, being sealed in a suitable manner.

As will be evident, the embodiment illustrated in FIG. 8 is slower in response and also not as accurate in positioning, as the embodiments previously described. However, there are numerous applications, which will be evident to those skilled in the art, in which such a force amplifier can be utilized to advantage.

Figure 9:
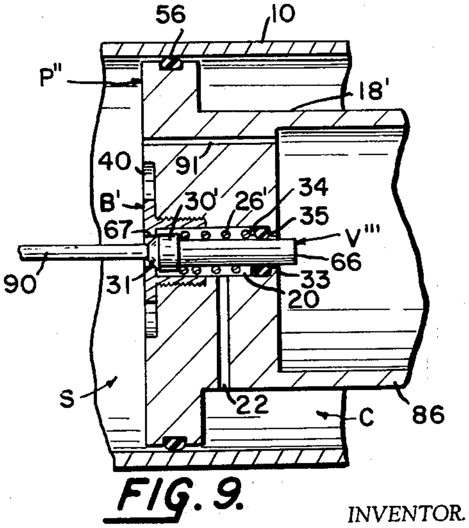
FIG. 9 is a fragmentary, longitudinal section of a force amplifier also constructed in accordance with this invention and forming another embodiment thereof.

A further embodiment illustrated in FIG. 9 is also a simplified construction, which may be utilized in numerous applications in which the embodiment of FIG. 8 might be utilized, and also includes only one valve, i.e., valve V‴ which is directly connected to a control rod 90. However, the piston P″ of FIG. 9 is normally continuously urged toward the left, as viewed in FIG. 9, rather than to the right, as in the case of piston P′ of FIG. 8, by virtue of a bleed hole 91 in piston P″, which provides continuous communication between the secondary pressure chamber S and the hollow interior of piston rod 86. Bleed hole 91 must, of course, be smaller than hole 22 in piston P″, which supplies fluid from primary pressource chamber C to valve chamber 20, as in the embodiments of FIGS. 1–7. The rear portion of valve V‴ is similar to the rear portion of valve V′ of FIG. 6, thus having a solid stem 66 movable in hole 33 in piston P″ and sealed by an O-ring 35 engaged by a washer 34 and held in sealing engagement by spring 26′, the opposite end of which bears against head 30′ to urge conical seating surface 31 into sealing engagement with central hole 67 of housing B′, with other parts of bushing B′ having corresponding reference numerals. Piston P″ has a reduced section 18′ from which hollow piston rod 86 extends, for movement in an opening in the corresponding end wall of cylinder 10, provided with a suitable seal, as before. Piston rod 86, as before, is attached to the part to be controlled or moved and may be integral with the piston, as shown, or a separate part attached thereto. Also as before, control rod 90 extends through a hole in the corresponding end wall for cylinder 10 and is sealed in a suitable manner, while the periphery of piston P is sealed by O-ring 56.

As will be evident, in the further embodiment of FIG. 9, the piston P″ will normally reach a stationary position, as long as control rod 90 is stationary, in which case valve V″ will be slightly open so that the fluid flowing through holes 22 and 67, from primary pressure chamber C to secondary chamber S will equal the amount of fluid discharged from chamber S through bleed hole 91. However, when control rod 90 is moved to the right, as viewed in FIG. 9, valve V″ will be opened further, so that piston P″ and piston rod 86 will be moved to the right. Similarly, when control rod 90 is moved to the left, valve V″ will close and fluid discharged from chamber S through bleed hole 91 will reduce the pressure in chamber S, so that piston P″ and piston rod 86 will be moved to the left. Also, whenever control rod 90 stops moving, piston P″ will reach a stationary position, in which the flow through slightly open valve V‴ will equal the flow through bleed hole 91.

As will be evident, the rate of movement of the piston and its piston rod, to the right in FIG. 8, is limited by the rate of flow through bleed hole 87, while the rate of movement to the left in FIG. 9, is limited by the rate of flow through bleed hole 91. Thus, both embodiments are particularly suitable for situations in which a higher rate of movement in one direction than another is desirable, the embodiment of FIG. 8 being preferable when such higher rate of movement is retraction of the piston rod and that of FIG. 9 being preferable when such higher rate of movement is extension of the piston rod.

Figure 10:
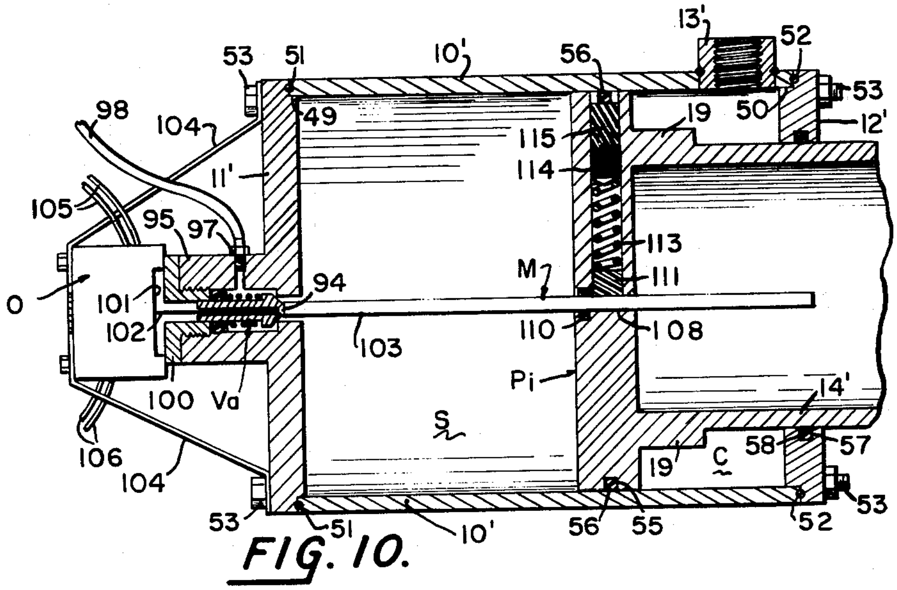
FIG. 10 is a fragmentary, longitudinal section of a force amplifier constructed in accordance with this invention and forming an additional embodiment thereof.
Figure 11:
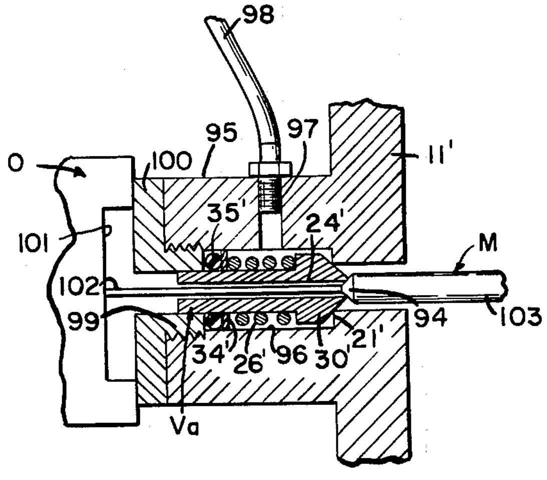
FIG. 11 is a fragmentary section corresponding to a portion of FIG. 10, on an enlarged scale.
Figure 12:
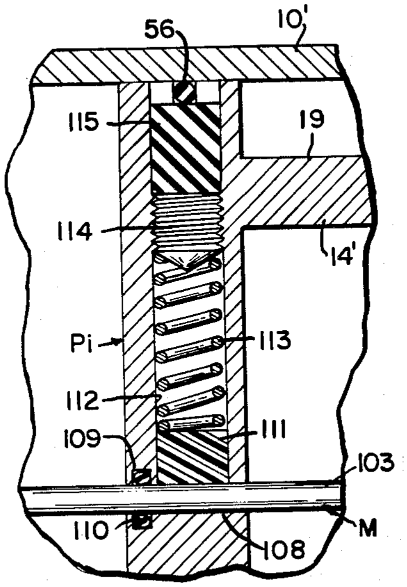
FIG. 12 is a fragmentary section corresponding to another portion of FIG. 10, on an enlarged scale.

In the additional embodiment of FIGS. 10–12, a control member M is operated by a double acting solenoid O, with the control member M extending through a hollow valve V*a* which controls the flow of fluid to a secondary chamber S and through which fluid is exhausted from the secondary chamber S. Control member M is provided with a valve 94 adapted to seat against the inner end of hollow valve V*a*, for permitting such exhaust when moved inwardly, and also is adapted to open valve V*a* when moved outwardly. Control member M also extends through piston P*i* and is slidable inwardly and outwardly therethrough, so that the piston may move without changing the opening of valve V*a* or the opening of valve 94, when the control member M is moved to a position corresponding thereto by solenoid O. However, piston P*i* is provided with a friction device or other suitable force applying means, as described below, which permits such sliding of control member M, but causes the control member to move with the piston when not held by the solenoid, so as to maintain the piston in any set position, in a manner explained later.

As before, a cylinder 10′ is provided with end walls 11′ and 12′, while piston P*i* is provided with a shoulder 19 and a piston rod 14′ which is conveniently hollow and extends through end wall 12′ to provide a primary chamber C whose effective cross sectional area at the piston is less than the effective cross sectional area of the secondary chamber S on the opposite side of the piston. As before, an inlet connection 13′ supplies fluid under pressure to the primary pressure chamber C, while the cylinder 10′ fits over shoulders 49 and 50 of the respective end walls and is sealed, as by O-rings 51 and 52. The cylinder 10′ is held between the end walls by bolts 53, the end walls preferably extending beyond the cylinder, as through a rectangular configuration. Also, the piston is provided with a groove 55 which receives a seal, such as an O-ring 56, while end wall 12′ is provided with a groove 57 which receives a seal, such as an O-ring 58, for piston rod 14′.

The end wall 11′ is provided with an axial extension 95 containing a passage 96, at the inner end of which, as in FIG. 11, is formed a seat 21′ for the head 30′ of the hollow valve V*a*, having a central passage 24′. Seat 21′ may be provided by a shoulder, as shown, or by a ring, as in the previous embodiments. Valve V*a* is urged toward its seat by a coil spring 26′, one end of which abuts head 30′ of the valve and the opposite end of which abuts a washer 34′, which also holds a seal for the stem of valve V*a*, such as an O-ring 35′, in position. Fluid under pressure for the secondary chamber S is supplied to passage 96 through a hole having threads to receive an inlet connection 97, in turn connected to a hose 98. The threaded stem 99 of a bushing 100 is received in the outer end of passage 96, for securing valve V*a* in position, it being noted that the rear end of the valve is movable within the bushing. A slot 101 in solenoid O permits fluid to be exhausted from the secondary pressure chamber S, through the passage 24′ in valve V*a* to atmosphere, in the event that the pressure fluid being utilized is air. Or, a suitable connection may be made at bushing 100 for return of the fluid to a tank or sump, in the event that a preferably recovered fluid, such as oil, is used.

The control member M, as indicated previously, is provided with valve 94, which engages a seat formed at the inner end of the central passage in valve V*a*, and the control member thus preferably includes a smaller rod 102 between solenoid O and valve 94 and a larger rod 103 between valve 94 and the opposite end of the control member. The length of rod 103 is preferably such that movement of piston P*i* to the opposite end of the cylinder will be accommodated.

Solenoid O may be secured in position by a bracket 104 which extends between two or more of the bolts 53 and holds the solenoid against bushing 100. The solenoid O is preferably double acting, thus having two windings, one of which, when energized, will move the control member M inwardly, as by current supplied through wires 105, and the other of which, when energized, will move the control member M outwardly and the valve V*a* along with it, as by current supplied through wires 106. It will be understood, of course, that the solenoid windings may be connected to a common wire, in which event only three control wires will be necessary.

As will be evident, when solenoid O moves control member M outwardly, valve V*a* will be moved outwardly with the control member, against the pressure of spring 26', thereby permitting fluid to flow from inlet connection 97 through passage 96 and into the secondary pressure chamber S. Due to the difference in the effective area on opposite sides of the piston, when substantially the same pressure is introduced into the secondary chamber S as the primary chamber C, the piston will be moved to the right, as viewed in FIG. 10. Similarly, when the control member M is moved inwardly by solenoid O, valve V*a* will become seated, if not already seated, and control member valve 94 will be unseated, permitting the fluid in secondary chamber S to be exhausted through the hollow valve V*a* and out through slot 101. This will reduce the pressure in secondary chamber S, so that the piston will be moved to the left, again as viewed in FIG. 10. As will be evident, the respective winding of solenoid O may remain energized until the piston rod 14' has been moved outwardly or inwardly any desired distance, as required. The pressure of fluid supplied to inlets 13' and 97 also may be so proportioned that the piston will be moved faster in one direction than the other.

Rod 103 of control member M, as in FIG. 12, extends through a hole 108 in piston P*i*, having a groove 109 adjacent secondary chamber S, in which an O-ring 110 is received, for sealing purposes. At times when neither winding of solenoid O is energized, the force on piston rod 14' may vary, so that it is desirable to maintain the piston and piston rod automatically in any position in which set. For this purpose, when the friction provided by O-ring 110 is insufficient, an additional friction or force applying device, such as a friction block 111, is utilized to permit rod 103 to slip inwardly and outwardly in the piston, as the piston is moved under the control of the solenoid O, but to cause the rod 103 to move with the piston when the solenoid is deenergized. Thus, any tendency for the piston to be shifted from its position due to a variation in the force on piston rod 14', from either a pushing or pulling force will be counteracted, since any force tending to move the piston to the left, as viewed in FIG. 10, will cause valve V*a* to be lifted off its seat, permitting additional fluid to flow into secondary chamber S through inlet connection 97, thereby reestablishing the position of the piston and the piston rod. Similarly, if a variation in force on the piston rod 14' tends to cause the piston and piston rod to move to the right, again as viewed in FIG. 10, such movement will cause valve 94 on control member M to be lifted off its seat, thereby permitting fluid to be exhausted from secondary chamber S, until the piston and piston rod resume their previous position. In this manner, the position of the piston rod 14' may be maintained automatically, after it is set in a particular position by control through solenoid O.

Friction block 111 is conveniently formed of nylon or other suitable material and, as in FIG. 12, is disposed at the inner end of a radial hole 112 in the piston, block 111 being held against rod 103 by the preferably substantially constant force of a coil spring 113, the outer end of which abuts against a set screw 114, adjusted to a desired position in a threaded portion of hole 112. The outer portion of hole 112 may be occupied by a plug 115, of rubber, neoprene or the like. The outer end of plug 115 may be flat beneath O-ring 56', as shown, or may extend outwardly substantially to the inside wall of cylinder 10' and be provided with a groove for receiving the O-ring 56'. As will be evident, a friction force or other restrictive force may be applied to rod 103 in any other suitable manner. The force exerted by coil spring 113 may be calibrated, at the factory, through proper adjustment of the set screw 114, so that the force which resists movement of rod 103 in the piston, comprising the friction produced by block 111 and the normally smaller amount of friction produced by O-ring 110, will be sufficient to overcome the force exerted by spring 26' on valve V*a*. Of course, the force exerted by the solenoid should be greater, in one direction, than the force resisting movement of the control rod in the piston and, in the other direction, the latter force and the force exerted by spring 26'. As will be evident, the pressure in chamber S, against the end of valve V*a*, will assist the solenoid in opening valve V*a* against the pressure of spring 26', thus reducing somewhat the force necessary for the solenoid to produce.

The embodiment of FIGS. 10–12 is particularly adapted to be utilized in opening and closing valves, either fluid valves or other valves, as well as adjusting the position thereof, or sliding or swinging gates or partitions which control the flow or movement of solid material, such as ore, crushed rock, gravel, chemical materials and the like. As will be evident, the control force exerted by solenoid O may be quite small, in comparison with the force produced by fluid pressure against the piston and necessary to open, close or adjust, such valves, gates or partitions. Applications of this embodiment include refinery valves, hopper discharge gates, conveyor feed and discharge gates and clamping devices, as well as others which will be evident to those skilled in the art. It will be noted that, in this embodiment, the amount of movement of the control member by the solenoid is considerably smaller than the movement of the piston rod and the corresponding movement of the device or element which is controlled. Thus, the control member M may be moved manually, as by a lever connected to the outer end thereof, so that when the lever is pushed in one direction, the piston and piston rod will be moved to the right, as viewed in FIG. 10, and when the lever is pulled in the opposite direction, the piston and piston rod will be moved to the left, again as viewed in FIG. 10. As will be evident, the lever may be held in one direction, to cause the piston and piston rod to move to the end of the path of travel thereof in a desired direction, as when opening or closing a valve or gate or the like. As will also be evident, any other type of actuating device may be utilized for moving the control member M.

From the foregoing, it will be evident that the present invention fulfills to a marked degree the requirements and objects hereinbefore set forth. Thus, each embodiment requires a minimum of force for actuation and is positive in response. The embodiments of FIGS. 1–7 will control within relatively narrow limits, the part to be controlled, while the embodiments of FIGS. 8 and 9 are greatly simplified in construction, but less accurate.

The embodiment of FIG. 7 is particularly adapted to be manually controlled, while the control force for the embodiment of FIGS. 1–4 may be derived from either longitudinal or angular motion and may also be exerted at a remote point, through the use of a flexible cable as a control member. The embodiment of FIGS. 10–12 is adapted to be operated by a solenoid or other device producing a comparatively small movement of the control member, but is effective to produce a considerably greater movement of the element being controlled. As will also be evident each embodiment is relatively simple in construction but is effective and efficient in operation.

Although several different embodiments of this invention have been illustrated and described, it will be understood that other embodiments may exist and that various changes and variations may be made, without departing from the spirit and scope of this invention.

What is claimed is:

1. A fluid operated force amplifier comprising:

a hollow cylinder having closed ends;

a piston movable longitudinally within said cylinder and having a piston rod extending through one end of said cylinder, said piston and piston rod providing a primary pressure chamber on one side of said piston and said piston providing a secondary chamber on the opposite side of said piston, the area of said piston exposed to fluid pressure in said secondary chamber being greater than the area of said piston exposed to fluid pressure in said primary chamber;

means for supplying fluid under pressure to said primary pressure chamber;

said piston having a passage, provided with a first valve seat, for supplying fluid under pressure from said primary chamber to said secondary chamber and said piston rod being hollow;

a hollow valve disposed in said passage and engageable with said first valve seat for controlling the flow of fluid to said secondary chamber, said hollow valve having a second valve seat and the hollow interior of said valve communicating with the hollow interior of said piston rod;

means for urging said hollow valve toward said first seat; and a control rod extending through said piston rod and from the hollow interior of said hollow valve, said rod having a valve engageable with said second valve seat so as to move said hollow valve away from said said first valve seat, when said rod is moved relative to said hollow valve in one direction, and to move said rod valve away from said second valve seat, when said rod is moved relative to said hollow valve in the opposite direction.

2. A fluid operated force amplifier comprising:

a hollow cylinder having closed ends;

a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;

an inlet connection for supplying fluid under pressure to said primary pressure chamber;

means for supplying fluid under pressure to said secondary chamber, said means including a passage and valve means for controlling the flow of fluid through said passage;

means for urging said valve means to closed position;

a discharge passage through which fluid is discharged from said secondary chamber;

auxiliary valve means for controlling the flow of fluid through said discharge passage;

means for urging said auxiliary valve means to closed position; and a control member extending from a point exteriorly of said cylinder for causing said first valve means to be moved toward open position against said urging means when said control member moves in one direction and for causing said auxiliary valve means to be moved toward open position when said control member moves in the opposite direction.

3. A force amplifier as defined in claim 2, wherein:

said passage for supplying fluid under pressure to said secondary chamber is in said piston and extends from said primary chamber to said secondary chamber, said passage being provided with a valve seat adjacent said secondary chamber; and said first valve means includes a hollow valve engageable with said seat and said piston rod is hollow, said hollow valve communicating with said hollow piston to provide said discharge passage.

4. A force amplifier as defined in claim 3, wherein:

said auxiliary valve means is formed by a valve mounted on the inner end of said control member and a seat at the adjacent end of said hollow valve;

a first spring surrounds said hollow valve for urging said hollow valve towards its seat; and a second spring surrounds said auxiliary valve for urging said auxiliary valve towards its seat, said second spring exerting a greater force than said first spring.

5. A precise positioning fluid force amplifier of the type constituting a piston within a cylinder having a wall, closed ends and a piston rod adapted to be forcibly extended and retracted through one end of the cylinder responsive to fluid pressure within the cyliner, with the piston being adapted to move responsive to movement of a control member to any selected position within the cylinder and the piston dividing the cylinder into a primary chamber at the piston rod side and into a secondary chamber at the opposite side thereof, said primary chamber being defined by said cylinder wall and the piston rod end of said piston and cylinder end and said secondary chamber being defined by the opposite ends of said piston and cylinder and said cylinder wall, the pressure of fluid in said primary and secondary chambers urging said piston and piston rod in opposite directions and the area of said piston exposed to fluid pressure in said primary chamber being smaller than the area of said piston exposed to fluid pressure in said secondary chamber, with pressurized fluid flow entering the primary chamber, flowing through a first passageway in the piston, past a first valve to enter the secondary chamber and flowing from the secondary chamber into a discharge passageway past an auxiliary valve, and wherein each valve includes a valve portion and a seat portion and wherein:

(a) said first valve includes a floating valve portion within said piston and a seat portion on said piston adjacent to the secondary chamber and means adapted to resiliently urge the valve portion against the seat to a normally closed position;

(b) that part of said floating valve portion of the first valve which extends through the seat when seated includes one portion of said auxiliary valve;

(c) said control member exteriorly of the cylinder includes a precise position means extending into the secondary chamber which carries the other portion of said auxiliary valve and is adapted to shift said other portion longitudinally within the secondary chamber towards and to a selected position within the chamber;

(d) said auxiliary valve includes in one of its portions a passageway which communicates with said discharge passageway and which is adapted to be closed by the other of its portions when the two portions move together;

(e) said precise position means is further adapted to move its valve portion away from the piston to a first selected position, whereby flow from the secondary chamber through the discharge passageway causes the piston to move towards said portion on the positioning means to interengagement of the auxiliary valve portions, whereby piston movement stops with both valves being closed, and is further adapted to cause its valve portion to move against the opposing auxiliary valve portion on the first said floating valve portion, to shift the floating valve portion and thereby open the first said passage to permit fluid flow from the primary chamber and into the secondary chamber to shift the piston away from said positioning means valve to interengagement of the first said valve portions, whereby piston movement stops with both valves being closed.

6. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;
an inlet connection for supplying fluid under pressure to said primary pressure chamber;
said piston rod being hollow and said piston having a passage extending from said primary chamber to said secondary chamber and provided with a valve seat, said passage also extending to the hollow interior of said piston rod;
a hollow valve movable into and out of engagement with said seat for controlling flow of fluid through said passage from said primary chamber to said secondary chamber, said hollow valve having a seat at its inner end and permitting discharge of fluid therethrough from said secondary chamber to the hollow interior of said piston;
means for urging said valve toward said seat; and
means including a control member extending into said cylinder and provided at its inner end with an auxiliary valve for engaging said auxiliary valve seat, for moving said hollow valve away from its seat and for moving said auxiliary valve away from its seat, said auxiliary valve being normally closed, and inward movement of said control member causes said hollow valve to open with said auxiliary valve closed, whereby flow from said primary chamber to said secondary chamber causes the piston to move until both valves are closed and piston movement stops, and outward movement of said control member causes said auxiliary valve to open with said hollow valve closed, whereby discharge of fluid from said secondary chamber causes said piston to move in the opposite direction until both valves are closed and piston movement stops.

7. A force amplifier, as defined in claim 6, wherein:
said auxiliary valve seat is annular; and
said control member comprises a rod provided with a conical point at its inner end.

8. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;
an inlet connection for supplying fluid under pressure to said primary pressure chamber;
means for supplying fluid under pressure to said secondary chamber, said means including a passage provided with a valve seat;
a valve movable into and out of engagement with said seat for controlling flow of fluid through said passage;
means for urging said valve toward said seat, said valve being hollow and provided with an auxiliary valve seat at the end engaging said passage seat; and
means including a control member extending through said hollow valve and having an auxiliary valve for engagement with said auxiliary valve seat, for moving said first valve away from said passage seat to admit fluid into said secondary chamber when said control member moves in one direction and for moving said auxiliary valve away from said auxiliary seat when said control member moves in the opposite direction.

9. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;
an inlet connection for supplying fluid under pressure to said primary pressure chamber;
said piston having a passage leading from said primary chamber to said secondary chamber and having an axial portion adjacent said secondary chamber;
first valve means in said axial portion of said chamber for controlling the flow of fluid from said primary chamber to said secondary chamber;
means for urging said valve means to closed position;
a hollow, movable control rod extending into said secondary chamber in axial alignment with said first valve means, for discharging fluid from said secondary chamber; and
second valve means formed between said hollow control rod and said first valve means, whereby inward movement of said control rod will open said first valve means and outward movement of said control rod will open said second valve means.

10. A fluid operated force amplifier comprising:
a hollow cylinder having closed ends;
a piston movable longitudinally within said cylinder and having a piston rod extending through one end of said cylinder, said piston and piston rod providing a primary pressure chamber on one side of said piston and said piston providing a secondary pressure chamber on the opposite side of said piston, the area of said piston exposed to fluid pressure in said secondary chamber being greater than the area of said piston exposed to fluid pressure in said primary chamber;
an inlet connection for supplying fluid under pressure to said primary pressure chamber;
said piston having a passage therein for the flow of fluid from said primary to said secondary chamber, said passage being provided with a valve seat;
said piston rod having a hollow interior and said passage in said piston extending to the hollow interior of said piston rod;
a valve provided with a stem normally extending into the hollow interior of said piston rod and a head at the opposite end having a seating surface movable into and out of engagement with said seat for controlling flow of fluid through said passage;

sealing means surrounding and engaging said stem adjacent the hollow interior of said piston;

a coil spring surrounding said stem and bearing at opposite ends against said head and said sealing means; and means for effecting the discharge of fluid from said secondary chamber through the hollow interior of said piston rod.

11. A force amplifier, as defined in claim 10, wherein said means for effecting the discharge of fluid from said secondary chamber comprises a second passage in said piston spaced from said first passage and leading from said secondary chamber to the hollow interior of said piston.

12. A fluid amplifier, as defined in claim 10, wherein: said valve is hollow and communicates with the hollow interior of said piston;

a control member extends within said hollow piston rod and through said hollow valve; and said control member is provided with an auxiliary valve for engaging a seat formed at the inner end of said hollow valve.

References Cited by the Examiner

UNITED STATES PATENTS

| | | | |
|---|---|---|---|
| 2,574,335 | 11/1951 | Leduc ----------- | 91—416 X |
| 3,054,387 | 10/1962 | Kellogg ---------- | 91—376 X |

SAMUEL LEVINE, *Primary Examiner.*

P. T. COBRIN, *Assistant Examiner.*